Nov. 5, 1940.  C. R. KUTIL  2,220,528
CONVERTIBLE BICYCLE ATTACHMENT
Filed Jan. 23, 1939
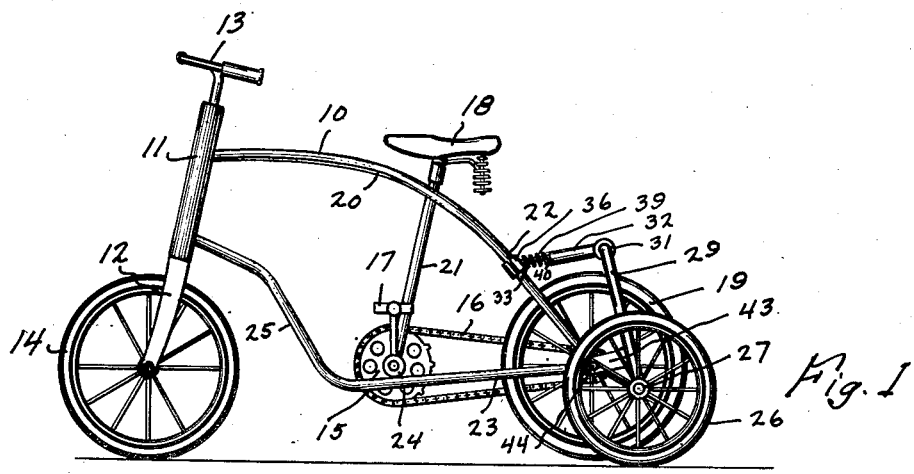
Fig. 1
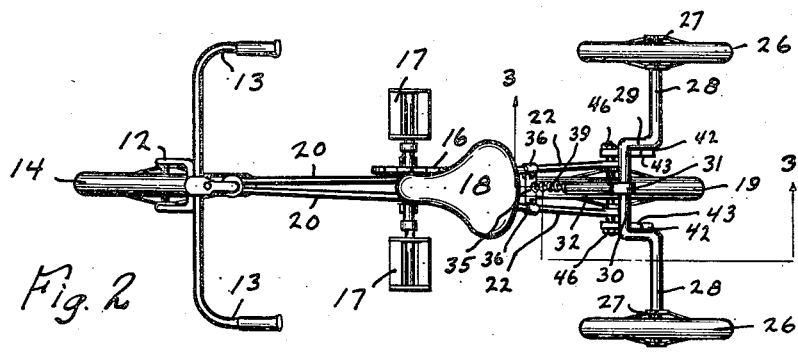
Fig. 2
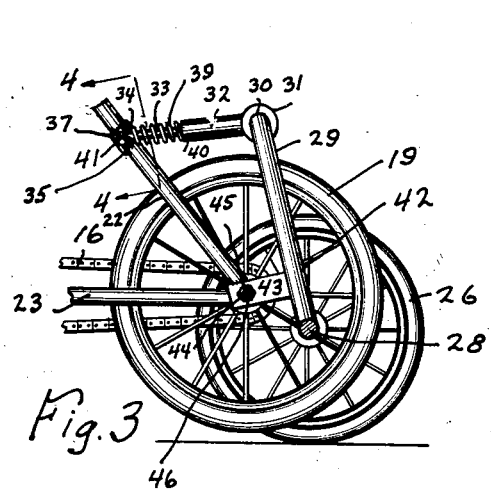
Fig. 3
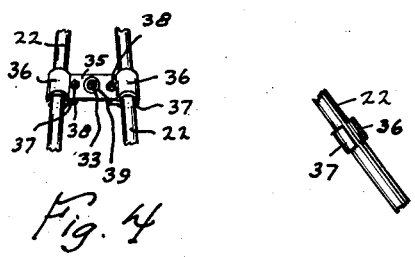
Fig. 4
Fig. 5
INVENTOR.
Clyde R. Kutil
BY Sam J. Slotsky
ATTORNEY.

Patented Nov. 5, 1940

2,220,528

UNITED STATES PATENT OFFICE 2,220,528

CONVERTIBLE BICYCLE ATTACHMENT

Clyde R. Kutil, Sioux City, Iowa

Application January 23, 1939, Serial No. 252,321

2 Claims. (Cl. 280—7.10)

My invention relates to a two wheel bicycle attachment.

An object of my invention is to provide an attachment for two wheel bicycles which will convert the same to a vehicle similar to a tricycle with the exception that the vehicle will become a four wheeled arrangement with three of the wheels at the rear thereof.

A further object of my invention is to provide an easily attachable arrangement which can be removed so that the arrangement will function as a simple two wheel bicycle.

A further object of my invention is to provide an attachment which will freely and resiliently support the center rear wheel of the arrangement off of the ground until the arrangement is used to insure a positive application of power to the center rear wheel and for other obvious reasons.

A further object of my invention is to provide the above mentioned objects in a simple construction which can be manufactured at a reasonable cost.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation of the arrangement as attached to a bicycle,

Figure 2 is a plan view of Figure 1,

Figure 3 is an enlarged detail taken along the lines 3—3 of Figure 2,

Figure 4 is a cross section taken along the lines 4—4 of Figure 3, and

Figure 5 is a side view of Figure 4.

My invention contemplates principally the usage on a small two wheel bicycle of an attachment which will allow a small child to use the same as a tricycle, and later when the child grows older to remove the attachment and to use the same as a two wheel bicycle. Also the arrangement can be changed from one construction to the other according to the desire of the rider.

I have used the character 10 to designate generally an ordinary two wheel bicycle frame having the steering post 11, the forward fork 12, the handle bars 13, the forward wheel 14, the sprocket 15, the drive sprocket chain 16 and the pedals 17. The seat is indicated by the character 18 and the rear wheel by the character 19. The usual pair of upper braces are indicated by the character 20, which braces are welded to the upright support 21 and which braces extend into the downwardly inclined portions 22 which members 22 terminate with the approximately horizontal braces 23 at the bottom of the bicycle which members 23 are suitably attached to the pedal journal 24 and which members 23 continue upwardly into the portions 25.

My attachment comprises the spaced side wheels 26 which are suitably journalled at 27 at the end of the horizontal rods 28 which rods extend into the integral vertical portions 29 and thence into the transverse cross portion 30. Pivotally journalled upon the portion 30 is the collar 31 which merges into the extended portion 32 and extending from the portion 32 is the bolt extension 33. The member 33 passes through an opening 34 in a cross brace 35 which brace continues into the arcuate portions 36 which are adapted to receive the members 22.

A pair of further arcuate clamps 37 receive the undersides of the portions 22 and are secured to the cross brace 35 by means of the bolts and nuts 38. Receiving the bolt 33 is the compression spring 39 which bears against the end 40 of the portion 32 and the other end of which bears against the cross piece 35. The end of the member 33 is threaded and securely locked thereto is the nut 41 which is located interiorly of the cross member 35. Securely welded or otherwise attached at 42 to the vertical portions 29 are the two link members 43 which are pivoted at 44 to the shaft 45 which normally passes through the center rear wheel 19. A nut 46 is used to retain the members 43. It will be noted that the pivoting point 44 is spaced a fairly substantial distance from the members 29 and it should be specifically noted that the construction is so made that the rear wheel 19 is supported a slight distance above the ground when the wheels 26 are resting on the ground. This is due to the spacing of the pivoting points on the links 43 as well as the pressure of the spring 39 against the shoulders 40 and the member 35.

When the arrangement is not in use, the rear wheel 19 is above the surface of the ground as shown and, however, when the child is seated on the seat 18, the pressure downwardly will carry the wheel 19 downwardly against the ground so that when the pedals 17 are worked, the rotation of the sprockets will drive the wheel 19 and exert the normal frictional engagement against the ground which will drive the vehicle. The arrangement also compensates for the fact that any of the rear wheels can ride over small obstructions without interfering with the driving, since any relative displacement of the side wheels 26 vertically or upwardly maintains the rear wheel in driving engagement with the ground surface due to the resilient spring 33 as well as the other structure described.

The resilient connections also provide an easy riding arrangement to absorb shocks and also when the tricycle is turned, the resilient friction of the wheel 19 with the ground will absorb a portion of the strain so that the turning effect can be accomplished without too much traction on all three rear wheels. This arrangement also permits of a constant compensating adjustment to the lower edges of the three wheels so that they will always ride on a constant level regardless of the wear on the tires, etc.

When it is desired to change the arrangement to a two wheel bicycle, the nuts 46 are removed there being sufficient play in the opening thereat to remove the members 29 therefrom, and the clamps 37 are removed and in this way the entire structure can be pulled off of the rear. The arrangement is rebolted in the converse manner for the other use.

It will now be seen that I have provided an attachment for two wheel bicycles which will allow usage of the same as a tricycle or similar arrangement, which includes resilient features to impart a positive drive to the vehicle, which includes means for absorbing shocks as well as an equalizing structure to compensate for wear, which includes means for maintaining the rear wheels of the arrangement on a constant plane at all times, which can be readily attached or detached and which can be manufactured at a reasonable cost.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. In combination with a two-wheeled bicycle, an attachment therefor comprising a pair of spaced side wheels spaced apart from the rear wheel of the bicycle, means for resiliently supporting said rear wheel therefrom, including a shaft member upon which said side wheels are journalled, said shaft member including upwardly extending portions, a transverse portion therebetween, a thrust member journalled upon said transverse portion, a clamp supported at the rear portion of said bicycle, a compression spring between said thrust member and said clamp, said spaced side wheels being journalled at a position behind the journalled position of said rear wheel, arms connecting said upwardly extending portions to said rear wheel and pivotally attached thereto.

2. In combination with a two-wheeled bicycle, an attachment therefor comprising a pair of spaced side wheels spaced apart from the rear wheel of the bicycle, means for resiliently supporting said rear wheel therefrom including a shaft member upon which said side wheels are journalled, said shaft member including upwardly extending portions, a transverse portion therebetween, a thrust member journalled upon said transverse portion, a clamp supported at the rear portion of said bicycle, a compression spring between said thrust member and said clamp, a pair of arms secured to said upwardly extending portions, said arms being pivoted to the shaft of said rear bicycle wheel.

CLYDE R. KUTIL.